United States Patent
Hamlin et al.

(10) Patent No.: US 6,432,233 B1
(45) Date of Patent: *Aug. 13, 2002

(54) COMPOSITE FILTER ELEMENT

(75) Inventors: Thomas J. Hamlin, Vernon; William Contaxis, III, Milford; Wei-Chih Chen, Meriden; Laurence W. Bassett, Killingworth, all of CT (US)

(73) Assignee: Cuno, Inc., Meriden, CT (US)

( * ) Notice: Subject to any disclaimer, the term of this patent is extended or adjusted under 35 U.S.C. 154(b) by 177 days.

This patent is subject to a terminal disclaimer.

(21) Appl. No.: 09/628,576

(22) Filed: Jul. 31, 2000

Related U.S. Application Data

(63) Continuation of application No. 09/300,249, filed on Apr. 27, 1999, now Pat. No. 6,139,739, which is a continuation-in-part of application No. 09/169,204, filed on Oct. 8, 1998, now abandoned.

(51) Int. Cl.[7] ................................................. B65B 7/01
(52) U.S. Cl. ........................................ 156/69; 156/293
(58) Field of Search .................... 156/690, 91, 293, 156/303.1; 210/315, 320, 321.88, 456, 458, 484, 489, 502.1

(56) References Cited

U.S. PATENT DOCUMENTS

| | | |
|---|---|---|
| 2,081,198 A | 5/1937 | Hahn |
| 3,519,134 A | 7/1970 | Hassinger |
| 4,045,851 A | 9/1977 | Ashare et al. |
| 4,139,468 A | 2/1979 | Rosaen |
| 4,334,993 A | 6/1982 | Norton |
| 4,636,307 A | 1/1987 | Inoue et al. |
| 4,749,484 A | 6/1988 | Greenhut |
| 4,804,467 A | 2/1989 | Losos |
| 4,814,078 A | 3/1989 | Stern et al. |
| 4,828,698 A | 5/1989 | Jewell et al. |
| 5,032,269 A | 7/1991 | Wollbeck et al. |
| 5,041,220 A | 8/1991 | Lee et al. |
| 5,102,542 A | 4/1992 | Lawrence et al. |
| 5,130,015 A * | 7/1992 | Simizu et al. ............... 210/136 |
| 5,139,668 A | 8/1992 | Pan et al. |
| 5,151,180 A * | 9/1992 | Giordano et al. ........... 210/264 |
| 5,188,727 A | 2/1993 | Kurth et al. |
| 5,225,079 A | 7/1993 | Saito et al. |
| 5,256,285 A | 10/1993 | Tomita et al. |
| 5,460,702 A | 10/1995 | Birkbeck et al. |
| 5,554,283 A | 9/1996 | Brinda et al. |
| 5,643,444 A | 7/1997 | Garrigues et al. |
| 5,647,950 A * | 7/1997 | Reed et al. .................. 156/580 |
| 5,656,160 A | 8/1997 | Parise et al. |
| 5,700,371 A | 12/1997 | Koslow |
| 5,707,518 A * | 1/1998 | Coates et al. ................ 210/232 |
| 6,139,739 A * | 10/2000 | Hamlin et al. .............. 210/315 |
| 6,325,929 B1 * | 12/2001 | Bassett ........................ 210/238 |

\* cited by examiner

Primary Examiner—Michael W. Ball
Assistant Examiner—Gladys Piazza
(74) Attorney, Agent, or Firm—Cummings & Lockwood

(57) ABSTRACT

A combination filter element comprising a bundle of hollow microporous fibers housed within an extruded carbon block, wherein the carbon block is fabricated to balance particle retention capacity against absorption capacity to provide a composite filter with desirable pressure drop, filter life, and particulate and chemical contamination reduction, and a filtration device, in which combination filter element may be employed, having a base portion including a sump which has an inlet and an outlet and a base which has a reception port for receiving the filter element.

37 Claims, 6 Drawing Sheets

COMPOSITE FILTER ELEMENT

RELATED APPLICATION

The subject application is a continuation application of commonly owned U.S. patent application Ser. No. 09/300,249, filed Apr. 27, 1999, of Hamlim et al., now U.S. Pat. No. 6,139,739, issued Oct. 31, 2000, which is a continuation-in-part application of U.S. patent application Ser. No. 09/169,204, filed Oct. 8, 1998, now abandoned, from which priority is claimed and the specification of which is herein incorporated by reference.

BACKGROUND OF THE INVENTION

1. Field of the Invention

The subject invention relates to a composite fluid filter cartridge comprising a bundle of hollow microporous fibers housed within an extruded carbon block, wherein the carbon block is fabricated to balance particle retention capacity against absorption capacity to provide a composite filter with desirable pressure drop across the cartridge, improved filter life, and desirable particulate and chemical contamination reduction.

The subject invention also relates to a fluid filtration apparatus, and more particular, to a countertop water filtration unit for domestic use in which such composite fluid filter cartridge may find use.

2. Background of the Related Art

Due to run-off and environmental contamination, drinking water in most areas of the world contains appreciable amounts of dissolved chemicals and suspended particulate material. A number of chemicals and particulates that may be found in drinking water have been associated with possible adverse physiological effects. Other chemicals and particulates in drinking water have been associated with less than desirable taste and sensory perceptions, such as "clouding" of the water or "souring" of the water. Certain chemicals and particulates in a water source may lead to undesirable rings in appliances and commodes using large amounts of water, and may result in unsightly films being placed on items washed in the water. In order to reduce particulate and chemical contamination of drinking water, such water is frequently treated by chemical processes. Of course, such processes themselves may introduce other types of undesirable chemical contaminants into the water. Chemicals are also not infrequently added to water to act as a sanitizing agent, for example, chlorine and bromine. The danger of such chemicals is only now being questioned.

In the estimation of many persons, municipal water treatment plants often fail to adequately deal with these problems. In order to improve water quality, many residences and businesses now employ on-site water filters to improve water streams consumed therein.

Prior Art Fluid Filters

Most systems for improving fluid quality use a series of filters. Filtration is the process of separating particles from a fluid suspension (liquid or gas) by use of a porous medium or by means of a medium possessing chemical properties, such as hydrophobicity, electrostatic charge, etc., which permit such medium to interact and hold the particles which are to be separated from the fluid while permitting the fluid to pass there through. Chemical contaminants are often removed by filters by means of chemical absorption into, or adsorption onto, the surface of the matter comprising the filter medium. Optimally, it is desired that the filter medium retains most of the suspended particles and many of the chemical contaminants, but allows the fluid being filtered to pass through unimpeded. Flow across the filter medium is generally achieved by the application of a driving force, usually in the form of a pressure difference across the filter, which may be generated, for example by external pressure applied upstream, a vacuum applied downstream, gravity, or other force.

Fluid filters are often of such dimensions or fabricated in a construct, so as to form relatively rigid replaceable filter units or "filter cartridges." Filter cartridges often employ granular activated carbon elements in their construct. Granular activated carbon is useful for removing organic chemicals such as chlorine, hydrogen sulfide, pesticides, herbicides, phenol, chlorophenol and hydrocarbon from water. Other filter elements may be employed in the cartridge construct to help, for example, to remove sediments such as rust and other particles. Silver is sometimes impregnated into one or more filter element to inhibit bacterial growth. Ion exchange resins may also be employed.

While filter cartridges containing granular activated carbon are known to be good at removing contaminants that affect taste, odor of the filtrate, and visible particulate matter, such filter cartridges generally are not fine enough to remove bacteria or viruses. Water may be contaminated with a number of micro-organisms including pathogenic bacteria, amoebae, flagellates, viruses and protozoa. In fact, as some water remains inside carbon granules after filtration, stagnant water in the carbon granules may act as a breeding ground for micro-organisms. Therefore, water discharged after a long period of non-use of a carbon-based filter cartridge may be contaminated with living organisms.

Recognizing that prior art filter cartridges which incorporate only a single filter medium, in particular a carbonaceous medium, suffer from the inability to remove many of the contaminants found in water, there have been developed filter assemblies employing a plurality of filter media, such as disclosed in U.S. Pat. No. 5,188,727. For example, in U.S. Pat. No. 4,828,698 there is disclosed a filter assembly having an outer cylindrically-shaped filter structure with porosity such as to be remove particulate matter, a inner cylindrically-shaped sorbant structure for sorbing chemical contaminants, and an inner-most cylindrically-retained microbiological filter, preferably comprising a microporous membrane for removing microorganisms, surrounding a perforated core housing a central void. By moving water across from the outer structure to the central void, particulates are removed, chemicals are adsorbed or absorbed, and microorganisms are filtered out.

Numerous microporous filter elements are utilized in the art to remove bacteria, viruses and other micro-organisms. Among these elements are hollow fibers having micropores coursing through the fiber walls. As disclosed in U.S. Pat. No. 3,526,001 (the disclosure of which is incorporated by reference herein), hollow selectively permeable fibers for use in filtration have been known for several years. Typical microporous hollow fibers include Celgard™ manufactured by the Questar division of Celanese Corporation. Such hollow fibers offer controlled and relatively uniform porosity as compared to many asymmetric ultrafiltration and microfiltration membranes. Fiber construct is such that there is high membrane surface area-to-volume ratio. The pores in the fibers form tortuous, interconnected channels leading from one surface of the fiber to the other. The pores of these hollow fibers allow the flow of fluid but block passage of many bacteria, colloids and other sub-micron particles. Fibers having pores of 0.05 microns or less are capable of filtering most viruses. In order to assure passage of the fluid through the fiber pores rather than through any end, such fibers are generally potted in an epoxy or other standard potting material at both ends of the fiber in a manner that the openings at both ends remain open.

Microporous hollow fibers have been mounted within filter cartridges in numerous ways including: placing them rectilinearly in the cartridge (e.g., U.S. Pat. Nos. 4,334,993, 5,041,220, 5,554,283), winding them about a cylindrical support (e.g., U.S. Pat. No. 4,045,851), and bundling them in a U-shape (e.g, U.S. Pat. Nos. 5,032,269 and 5,225,079). By judicious selection of hollow tubule lengths, as disclosed, for example, in U.S. Pat. No. 5,032,269 (the disclosure of which is incorporated by reference herein), a U-shaped bundle of microporous hollow fibers aids in maximizing filtration surface area, and thus filtration efficiency, while providing ease of manufacture and placement of the fibers in sealant material.

U.S. Pat. No. 4,636,307 discloses a filter unit housing particulate granulated activated carbon surrounding a bundle of U-shaped porous hollow fibers. Such system is said to aid in both removing chemicals and impurities from the filter water, as well as micro-organisms. While such system improves water filtration, use of mobilizable carbon particles in its construct can be said to suffer from several disadvantages, among these the settling of the particles over time leading to decreased filtration efficiency, and channeling of filtrate in the sorbant bed due to unintended shock or vibration leading to a decrease in the reliability of the filtration system. Further the disclosed embodiment housing the U-shaped porous hollow fibers within the housing granulated activated carbon indicates a housing about the fiber bundle significantly reducing radial flow through the fibers, and consequently leading to increased pressure drop across the unit and reduced filtration rate.

U.S. Pat. No. 5,102,542 discloses a canister-type filter comprising a carbon block or molded carbon block surrounding or operatively connected to a recti-linear bundle of porous hollow fibers housed within a flow control tube. The flow control tube is disclosed to be comprised of resin material and to be positioned about the porous hollow fiber bundle preferably for approximately 70% of the bundle's length. The flow control tube is said to force water to take a longer path through the carbon block, thereby improving filtration. While use of the carbon block permits filtration without the problems associated with settling of the sorbant or channeling of the filtrate in the sorbant, the filter of U.S. Pat. No. 5,102,542 suffers from drawbacks that make use of such filters less than desirable. First, the described filter assemblies, owing in part to employment of a flow control tube, require high fluid pressures for filtration and result in high fluid pressure drop in the filtration process. While filtration through the carbon medium may be said to be improved by increasing the path of flow through the medium, this reference fails to take into account that filtration rate efficiency across the porous hollow fibers and filtration life of the assembly is significantly reduced by reduction of the exposed surface area of the fibers available for radial filtration. Rectilinear potting of the microporous hollow fibers further adversely impacts on the filtration flow rate by failing to maximize surface area exposed to the incoming filtrate.

There is a need, therefore, for an improved filtration assembly which effectively reduces both particulate mass and chemical contamination in a fluid stream, which affords adequate filter life and provides for consistent filtration quality relatively unaffected by the age of the filter or by ordinary handling of the filter unit.

Prior Art Fluid Filtration Units

Until relatively recently, most on-site water filters were typically designed to be mounted in a permanent housing coupled to a water stream, such as in series with a pipe. Such permanent housings were often located in relatively poorly accessible locations (such as under a sink or in the basement) and often required special tools in order to gain access to the filter residing in the housing (such as a wrench). While on-site permanent filters are often perceived to remediate the water sufficiently for everyday uses, such as washing dishes and clothes, there is a large and growing number of people who demand cleaner and more tasteful water for internal consumption. Rather than adding new types of filters into permanent-type on-site water filter housings or increasing the number of such housings, in order to provide for a more convenient manner of coupling filters to water streams and of changing filters, so-called "countertop filtration units" were developed. "Countertop filtration units" are portable filter apparatuses dimensioned to fit on a standard household countertop and adapted for coupling to a fluid flow outlet spigot, such as a faucet. Such units are generally intended for domestic use to filter impurities out of tap water. The unit may be placed on a counter adjacent to a sink.

Countertop filtration units are generally fabricated from plastic and/or metal. Conventionally, these units comprise a base upon which a "sump", such as a cup or cover, which acts as a sump, is placed and in which the filter cartridge is housed. The "sump" is generally screwed into the base wherein a seal typically exists to permit fluid tight sealing. The filter in conventional counter filtration units is changed by removing the "sump", pulling out the spent filter, inserting a new filter into the "sump" and reattaching the same to the base. The "sump" has an inlet opening to enable an entrance of the fluid into the "sump" and through the filter materials. The "sump" further has an outlet opening to enable the fluid to be discharged from the "sump" after it has coursed through the filter. The unit may filter be equipped with a valve to selectively divert the fluid flowing to the filter cartridge.

Filters used in countertop filtration units are designed to be disposable. One commonplace type of disposable filter is in the form of a solid porous cylinder having a hollow center. When such filters are employed, the fluid to be filtered flows radially through the wall of the cylinder. between its exterior and hollow core. Such filters are generally capped at each end with a boundary sealing-cap to permit sealing between the filter and the housing in which it is placed in such a manner as to assure that only fluid having passed through the wall of the filter cylinder and into the hollow core is permitted to exit from the filtration unit.

Typically, countertop filtration units employ filters fabricated from granular activated carbon. As noted above, while carbonaceous filter elements are known to be good at removing contaminants that affect taste, odor of the filtrate, and visible particulate matter, such filters generally are not fine enough to remove bacteria or viruses.

Countertop filter cartridges conventionally can be classified as being either of two types: encapsulated and drop-in. Encapsulated cartridges incorporate the "sump", such that the "sump" must be replaced with the filter element. The advantages of encapsulated cartridges are that they are user friendly and the seal between the base and "sump" are replaced each time. There also are advantageous to manufacturers in that they generally require proprietary cartridge replacement. Drop-in cartridges on the other hand are replaced independently of the "sump", the "sump" being re-used each time. The advantage of the drop-in cartridges over encapsulated cartridges is that such cartridges are generally cheaper.

There are problems associated with countertop filtration units employing either encapsulated or drop-in filter cartridges. Both systems require removal of the "sump" from the unit in order to replace the filter. Removal of the "sump" from the base is often less than convenient, given that the "sump" is generally screwed into the base by means of relatively large threads. Further, as most countertop filtration units house the "sump" in an external housing, designed in part to hide the rather non-aesthetic "sump" and inflow/outlet tubes, the external housing must also be removed before access to the "sump" may be had. As the process involved in removing and changing either encapsulated or drop-in filter cartridges is relatively complex, fluid filtration quality often suffers due to less than optimal replacement of the filter. In regard to "drop-in filter cartridges" such filters suffer not only from the problems associated with ease of access to, and replacement of the filter element, but also with respect to the need to continually replace the seal between the "sump" and the base. On the other hand, "encapsulated cartridges," due to the inherent cost of the "sump" which is replaced with each filter change, can be far less than economic.

There is a need, therefore, for an improved countertop filtration unit which permits easy replacement of filter elements and aids in assuring adequate sealing between the "sump" and base.

SUMMARY OF THE INVENTION

Novel Fluid Filter Elements

The present inventors have resolved many of the problems associated with prior art filter assemblies, particularly those of the cartridge-type, by employing a composite filter medium comprising a carbon-based filter medium to remove particulates and to absorb chemical contaminants, and microporous hollow fibers, or other microporous filter elements, for removal of micro-organisms. The present inventors have discovered that by using a carbon block surrounding a bundle of microporous hollow fibers (preferably the bundle being in a U-shape) wherein radial flow is permitted along the greater part of the surface area of the hollow fiber bundle that a desirable blend of utilization life, filtration rate outflow, and pressure differential across the filter assembly can be achieved, without significantly affecting the quality of the filtered fluid (in particular as compared to prior art embodiments employing both medium for purposes of filtration). In particular, the present inventors have discovered that by balancing the chemical sorptive properties of the carbon block against the pressure drop across the block, that a carbon block/microporous hollow fiber filter assembly can be prepared with significantly improved properties over the prior art. Such improvements considerably advance the art, and argue against the prior art teaching of the need for output restricting flow control tubes, and the like, to be placed over the majority of the surface area of a microporous hollow fiber bundle when a carbon filter medium, in particular a solid carbon block, is used as a pre-filter.

When designing a filter it is desired to have as low as possible a pressure differential across the filter unit, as the larger the pressure drop across a filter unit, the more energy is needed to move fluid through the filter unit for the same filtration rate. It is also desirable to optimize as much as possible the sorbant activity of the filter medium in order to efficiently remove solubilized chemical components from the fluid being filtered. It is yet further desired that fluid filtration rate be high enough to provide adequate filtered fluid per unit time. And, of course, it is yet further desired that improvement of any, or all, of these factors not affect the quality of the product produced by the filtration process. Failure to account for any of these factors may result in a commercially-unacceptable product.

As would be recognized by one of skill in the art, balancing of each of the above factors is particularly difficult given the many competing parameters involved. For example, both pressure drop and adsorption rate are strongly influenced by particle size. Unfortunately, a change in particle size and particle size distribution has opposite effects on these two factors. Resistance to fluid flow is inversely proportional to the void spaces in a packed bed of particles. Therefore, small particle sizes typically increase resistance to fluid flow and cause a high pressure drop. Adsorption, on the other hand, which typically is greatly affected by the mass transfer resistance of the particles (a measure of adsorbate transport from the bulk fluid phase to the internal surfaces of the adsorbent particles), generally is greatly increased by reducing particle size. When mass transfer resistance is reduced, the mass transfer zone is correspondingly reduced (i.e., a long mass transfer zone is typically caused by a large mass transfer resistance), thus generally substantially increasing the efficient operation of adsorption/desorption cycles. A long mass transfer zone, which generally entails a large quantity of partially utilized absorbent, will result in a short adsorption step and inefficient use of the adsorbent capacity. The mass transfer transport rate is dominated by two mass transfer mechanisms in series: (a) interfacial mass transfer, that is, diffusion through the fluid boundary layer surrounding the external surface of the adsorbent particle; and (b) intraparticle mass transfer-diffusion through the internal pore space (micropores and macropores) of the particle to its interior surface where adsorption can take place. In short, small particles offer large fluid/solid contact areas in the fixed bed for interfacial mass transfer and reduce the path length for the intraparticle diffusion. Sorption kinetics are also typically improved by small particle size. Sorption, of course, is also affected by the composition of the sorption particles.

In a similar fashion, an increase in fluid flow rate typically reduces sorption of solubilized contaminants. Such is due to the fact that increased fluid flow rate reduces the time in which the fluid to be filtered is allowed to remain in contact with sorbant material. As each type of particle differs in the rate at which adsorbate is transported from the bulk fluid phase to the internal surfaces of the sorbant particles, increased flow above a certain rate may significantly decrease the probability that sorption will occur before the fluid leaves the filter. If the rate of fluid flow is too high, adequate filtration is not achieved. Fluid flow rate may also be affected in an opposite manner than sorption rate based on the composition of the sorption particles.

Prior art filter elements which attempt to reduce both particulate contamination, dissolved chemical contamination, and micro-organisms suffer from a number of deficiencies. Many of these filter elements use particle-packed housings as a pre-filter to a microporous membrane filter. Such filter elements suffer from an inherent capacity of freestanding particles to repack within the housing. Re-distribution of particles, in particular packing, can lead to decreased filtration quality. Further, channeling within the particle bed can also adversely affect filter fluid quality.

Combination filter elements which attempt to overcome this problem by featuring a sorbant containing structure in which the sorbant material is immobilized, such as in U.S. Pat. No. 4,828,698, suffer from a relatively low surface area proffered by the microporous element to the fluid which has passed through the sorbant filter element. The relatively low surface area causes an increase in fluid pressure across the unit, and leads to more rapid clogging of the membrane filter (and thus lower filter unit life expectancy).

Combination filter elements have been developed which attempt to replace the membrane filter with other microporous filter elements, such as microporous hollow fibers. Generally such combination filter elements are placed in spacial seriatim from each other, one on top of the other, thereby requiring a separate housing following the particulate/sorbant pre-filter and, therefore additional cost in filter unit fabrication. Certain combination filter elements, however, place the microporous filter element within the particulate/sorbant pre-filter. Prior art filtration assemblies of such construct are, unfortunately, far from optimal.

U.S. Pat. No. 5,102,542 teaches use of a carbon block rather than granulized particles in a housing, thereby reducing the possibility of decreased filtration quality due to re-distribution of particles and removing the need for a special housing to house the particle. However, the patent further teaches use of microporous hollow fibers in a non-surface area optimizing rectilinear formation surrounded along the greater part of the length of the fibers by an impermeable flow control tube. The tube is placed along the fibers in order to improve filtration by forcing at least a part of the fluid to take a longer path through the carbonaceous filter. Such control tube, however, leads to substantially increased fluid pressures across the unit of a given flow rate (reduces the fluid flow rate for the same pressure differential), and reduces significantly the amount of the microporous filter that can be incorporated into the design. Further, by restricting axial filtration into the microporous filter element, fluid flow rate through the unit is significantly reduced.

U.S. Pat. No. 4,636,307 discloses a U-shaped microporous hollow fiber bundle within a housing containing granulated particulate material. While the U-shaped bundle increases surface area over a rectilinear arrangement, U.S. Pat. No. 4,636,307, like U.S. Pat. No. 5,102,542, also teaches that the greater part of the linear length of the bundle be covered in an impermeable covering (See, e.g., FIG. 10). The patent further fails to consider the problem of particulate packing and channeling that not infrequently occur with particulate-packed housings.

The present inventors have overcome the drawbacks of such prior art combination filter elements by housing a significantly unsheathed microporous, hollow fiber bundle, preferably in a U-Shape, in a carbon block. The inventors have particularly discovered that by carefully adjusting the particle size and construct of the carbon block, so as to balance mass transfer resistance (and thus chemical sorptive activity) against desired pressure drop, that a highly efficient combination filter unit utilizing carbon for particulate removal and sorptive chemical reduction, and microporous hollow fibers for removal of micro-organisms, can be constructed without unacceptable pressure drop across the filter unit and without the need for substantially limiting quantity of fibers, and size of the fiber bundle, available for radial filtration (thereby reducing filtrate rate). Such construct provides a much more robust filter unit then those constructs previously available, without the drawbacks of unacceptable pressure drop across the filter unit, unacceptable fluid filtrate clearance through the unit, unacceptable filtrate quality, and additional parts in the construct of the filter unit. The inventors have further discovered that by adding a more open porous pre-filter outside of the carbon block that the purity of the filtrate can be even more improved without adverse effect on pressure across the filter and filtrate clearance rate.

An embodiment compound filter cartridge of the present invention, useful for filtering fluids, comprises a carbonaceous filter block element surrounding a void wherein the carbonaceous filter element has a fluid entry port located proximal to an outer portion of the carbonaceous filter element, and a selectively permeable fiber bundle positioned in the carbonaceous filter element void for receiving fluid which passes through the carbonaceous filter element into the carbonaceous filter element void. Preferably, the carbonaceous filter element is defined at least in part by an extruded carbon block, but can also be defined in part by a molded carbon block, or formed in part by means of wet-felting, dry-felting and a variety of other techniques. Preferably, the fiber bundle comprises a plurality of hollow, microporous fibers each having a first open end and a second open end. Preferably, the first and second open ends are potted in a sealing compound such that the first open end and the second open end of each of the hollow fibers are exposed on an outer end face of the sealing compound body permitting fluid entering the hollow, microporous fibers to exit through said outer end face of said sealing compound body. Preferably, less than about 60% of the selectively permeable fiber bundle is sheathed from axial flow.

Another compound filter cartridge embodiment of the present invention comprises a carbonaceous filter element surrounding a void wherein the carbonaceous filter element has a fluid entry port located proximal to an outer portion of the carbonaceous filter element; a cage positioned in the carbonaceous filter element void, and a selectively permeable fiber bundle positioned in the cage for receiving fluid passing through the carbonaceous filter element into the carbonaceous filter element void. Preferably, the carbonaceous filter element is defined at least in part by an extruded carbon block, but can also be defined in part by a molded carbon block, or formed in part by wet-felting, dry-felting and a variety of other techniques Preferably, the fiber bundle comprises a plurality of hollow, microporous fibers each having a first open end and a second open end. Preferably, at least one open end is potted in a sealing compound, anterior to the cage and the carbonaceous filter element, such that the open end is exposed on an outer end face of the sealing compound body permitting fluid entering the hollow, microporous fibers to exit through said outer end face of said sealing compound body. Preferably, the cage has sufficient openwork such that more than about 40% of the surface area of the selectively permeable fiber bundle is in direct contact with fluid when fluid fills the carbonaceous filter element void.

And yet, another compound filter cartridge embodiment of the present invention, which is useful for filtering fluids, comprises: a carbonaceous filter element surrounding a void approximately concentric with a central axis of the carbonaceous filter element, the carbonaceous filter element having a fluid entry port located proximal to an outer portion of the carbonaceous filter element; a perforated jacket positioned in the carbonaceous filter element void in a manner approximately concentric with the central axis of said carbonaceous filter element, and a selectively permeable fiber bundle positioned in the perforated jacket for receiving fluid passing through the carbonaceous filter element into the carbonaceous filter element void. Preferably, the carbonaceous filter element is defined at least in part by an extruded carbon block, but can also be defined in part by a molded carbon block, or formed in part by wet-felting, dry-felting and a variety of other techniques. Preferably, the fiber bundle comprises a plurality of hollow, microporous fibers each having a first open end and a second open end. Preferably, at least one open end is potted in a sealing compound such that the open end is exposed on an outer end face of the sealing compound body permitting fluid entering the hollow, microporous fibers to exit through the outer end face of the sealing compound body. Further, it is preferred that the perforated jacket has sufficient perforations such that more than about 40%, more preferably, more than about 50%, and yet more preferably, more than about 70% of the surface area of said selectively permeable fiber bundle is in direct contact with fluid when fluid fills said carbonaceous filter element void.

And, there is disclosed a compound filter cartridge embodiment for filtering fluids comprising: a pre-filter element, for filtering course particulates, surrounding a void, the pre-filter element having a fluid entry port located proximal to an outer portion of the pre-filter element; a carbonaceous filter element positioned in the pre-filter element void, the carbonaceous filter element surrounding a carbonaceous filter element void, and a selectively permeable fiber bundle positioned in the carbonaceous filter element void for receiving fluid passing through the pre-filter element and carbonaceous filter element into the carbonaceous filter element void. Preferably, the fiber bundle comprises a plurality of hollow, microporous fibers each having a first open end and a second open end. Preferably, the carbonaceous filter element is defined at least in part by an extruded carbon block, but can also be defined in part by a molded carbon block, or formed in part by wet-felting, dry-felting and a variety of other techniques. Preferably, the first and second open end are potted in a sealing compound in such a manner that the first open end and the second open end of each of said hollow fibers are exposed on an outer end face of the sealing compound body permitting fluid entering the hollow, microporous fibers to exit through the outer end face of the sealing compound body. Preferred pre-filter material includes polypropylene, polyester, and various other non-woven material, cellulosic, glass, or other sheet-like filtration mediums.

Novel Countertop Filtration Unit

The present invention further provides an improved countertop filtration unit which provides user-friendly filter cartridge replacement and aids in assuring adequate sealing between the sump and base. The present invention provides a countertop filtration unit having a sump integral with the unit's base, the base having a reception port for filter element engagement into, and disengagement out of, the sump.

By "sump" it is meant any reservoir serving as a receptacle for liquids which is constructed so as to able to withstand the fluid pressures to which it is exposed. By "base" it is meant any housing on which the sump rests and which is designed to typically interface with the surface upon which the filter unit is to be placed. By "reception port" it is meant any communication area positioned in the base permitting reception of a filter cartridge into the area and out of the area. By "end-cap" it is meant a substantially solid piece of material placed at the end of a filter element which is dimensioned so as to at least seal the greater portion of the surface area of an end of the filter element. By "adapter" it is meant any structure for joining one element to another. By "fluid adapter," it is meant a structure for allowing communication of a fluid stream with the filter element, typically by means of fluid conduits, such as tubing. By "filter element" it is meant any combination of materials used to filter out suspended or dissolved particles or chemicals from a fluid. By "microporous hollow fibers" it is meant an elongate structure having a central void constructed such to have a relatively high membrane surface area-to-volume ratio and porous walls wherein the pores of the wall lead from one surface of the fiber to the other surface of the fiber and are substantially of such size as to be able to block the passage of submicron particles and organisms. By "external housing" it is meant any housing for surrounding and enclosing the sump. By "inlet" it is meant an opening for intake of fluid, whereas by "outlet" it is meant an opening for the out-take of fluid.

One embodiment of the present invention includes a filtration unit which comprises a base portion including a sump for accommodating a filter element and a reception port for receiving the filter element. The sump has an inlet and an outlet. Preferably the reception port is defined in a bottom surface of the base portion. The unit may further include an external housing portion for engaging the base portion to enclose the sump. Preferably the end cap includes a camming surface for cooperating with a complementary surface in the base portion to facilitate engagement and disengagement of the end cap and the reception port.

Preferably, the filtration unit has the sump integral with the base portion, and the reception port is defined in a bottom surface of said base portion. Preferably, the filter element to be received in the reception port is dimensioned and configured for accommodation within said sump, and is constructed so as to have an end cap dimensioned and configured for engaging the reception port. The end cap may include a camming surface for cooperating with a complementary surface in said base portion to facilitate engagement of the end cap and the reception port. Preferably, a first seal is associated with either or both the reception port and the end cap so as to effect a seal between the end cap and the base portion. A second seal may further be associated with either one end of the filter element and/or the interior surface of the sump to effect a seal between said filter element and the sump. The filter element may be defined at least in part by an extruded carbon block or by hollow microporous fibers. Preferably, the filter element is a composite filter element including first and second filtration media, wherein the first filtration media comprises an extruded carbon block and the second filtration media comprises hollow microporous fibers.

Still another embodiment of the present invention includes a filtration device which comprises a filter element having an end cap provided at a first end thereof, a base portion including an integral sump for accommodating the filter element and a reception port for receiving the filter element and engaging the end cap; and a housing portion for engaging the base portion to enclose said sump.

In a preferred embodiment the sump is formed monolithically with the base portion. It is preferred that the reception port be defined in a bottom surface of the base portion. While the end cap may be engaged to the base by any of the many attachment mechanisms known in the art, in one embodiment, the end cap includes camming lugs for cooperating with a complementary camming surface in the base portion to facilitate engagement of the end cap and the reception port. It is preferred that a first seal be associated with at least either the reception port and/or the end cap to effect a seal between the end cap and the base portion. A second seal may be associated with at least one of an end portion of said filter element and an interior surface of the sump to effect a seal between the filter element and the sump. The filter element may be defined at least in part by an extruded carbon block or by hollow microporous fibers. Preferably, the filter element is a composite filter element including first and second filtration media, wherein the first filtration media comprises an extruded carbon block and the second filtration media comprises hollow microporous fiber.

And yet another embodiment of the present invention includes a filter device for housing a filter element having an end cap associated with an end thereof, which comprises a base portion for accommodating the filter element, the base portion being integral with a sump having an inlet and an outlet, wherein the base portion encompasses a void through which the filter element may be positioned in said sump, and the base portion surrounding said void includes an engagement surface complementary to the surface of the end cap for engaging the filter element; and a housing portion for engaging the base portion to enclose the sump.

These and other unique features of the combination filter element and filtration system disclosed herein will become more readily apparent from the following description, the accompanying drawings and the appended claims.

BRIEF DESCRIPTION OF THE DRAWINGS

So that those having ordinary skill in the art to which the disclosed combination filter element and filtration system appertains will more readily understand how to make and use the same, reference may be had to the drawings wherein.

DETAILED DESCRIPTION OF THE INVENTION

Novel Fluid Filter Element

Figure 1:
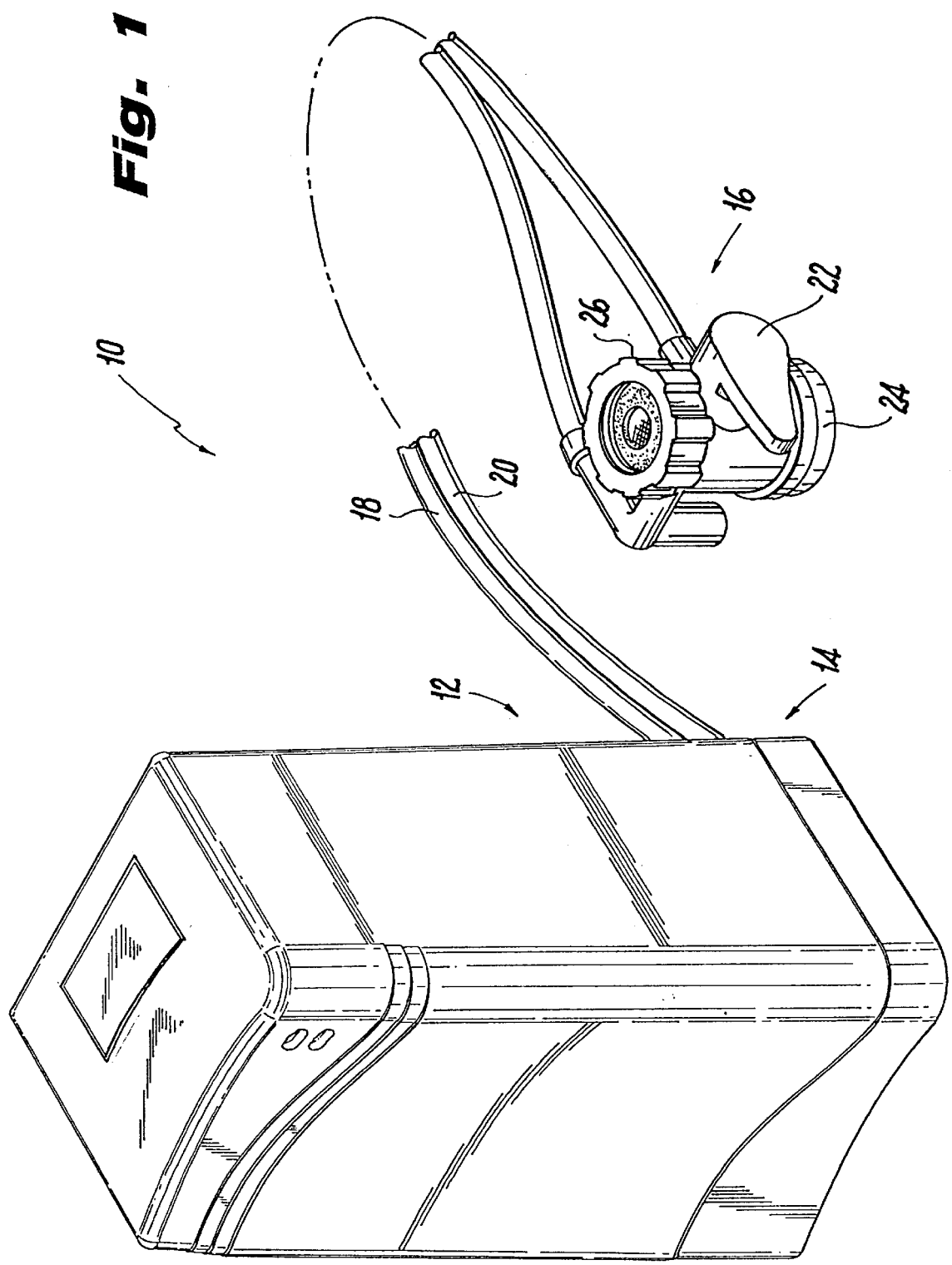
FIG. 1 is a perspective view of a countertop filter unit coupled to an adapter assembly for attaching the filter unit to a fluid stream.

The above described filter unit preferably employs a combination filter element incorporating activated carbon bound into block by binders. The use of a carbon block aids in providing rigidity to the filter structure, overcomes the need for an external housing, as well as substantially eliminates the possibility of channeling and re-distribution of carbon particles, and permits the bed structure to remain stable throughout its service life. The carbon block is used to surround a significantly un-sheathed microporous hollow fiber bundle which preferably is in a U-Shaped form to optimize the surface area available to radial filtration.

By recognizing the importance of optimizing the balance between sorptive activity and pressure drop across the carbon block, the present inventors have overcome the need to employ control flow tubes which sheath the greater part of microporous hollow fiber bundles, as found in prior art combination filter assembly embodiments. Removal of such control flow tubes permit greatly improve filtration rate, increase the in-line life of the filter unit and permits more efficient radial flow into the fibers. The inventors have discovered that by carefully adjusting the composition of the carbon block to minimize pressure drop per unit change measured in air flow resistance across the carbon block, superior carbon block compositions may be developed for use in filter units employing a carbon-based particle retention/sorptive filter element and microporous hollow fiber element. Such filter units significantly exceed the filtering characteristics of similar prior art constructs.

The air flow resistance (AFR) per depth of filter media (d) may be calculated via the equation: $\Delta P/d = k\, F/A$ wherein k is a constant, F is the flow rate of the fluid passing through the filter media and A is the filter area through which the fluid being filtered passes. The present inventors have discovered that carbon blocks having a "k-value" (which is represented by the slope of a plot of pressure drop per unit depth (e.g. inch of $H_2O$/inch filter traversed) versus rate of air flux (e.g., $SCFH/ft^2$)) of between about 0.01 to about 0.10, more preferably between about 0.02 to about 0.07, and yet more preferably between about 0.03 to about 0.05, demonstrate superior adsorption capacities without an unacceptable reduction in fluid flow rate, or a need for increased pressure to retain fluid flow rate. The filter unit life of carbon block/microporous hollow fiber assemblies has also been shown to be markedly enhanced when the carbon block has a k-value between these ranges. As would be known to one of ordinary skill in the art, the "k-value" typically has units of $$\frac{(\text{in } H_2O)\,(ft^2)}{\text{in. media}(SCFH)}.$$

Novel Countertop Filtration Unit

The present invention further overcomes many of the prior art problems associated with countertop filtration units. There is provided a significantly improved countertop filtration unit which allows for user-friendly filter cartridge replacement, as well as aiding in assuring adequate sealing between the sump and base. The present invention provides a countertop filtration unit having a sump integral with the unit's base, the base having a reception port for filter element engagement into, and disengagement out of, the sump.

Representative Illustrations of the Present Embodiments

The advantages, and other features of the novel combination filter element and novel countertop filtration unit, in which such elements find particular usefulness, will become more readily apparent to those having ordinary skill in the art from the following detailed description of certain preferred embodiments taken in conjunction with the drawings which set forth representative embodiments of the present invention and wherein like reference numerals identify similar structural elements.

Referring to FIG. 1, there is shown a perspective view of a countertop filter unit 10 coupled through one or more conduits 18, 20 to an adapter assembly 16 for attaching the filter unit to a fluid stream. Countertop filter unit 10 includes a base 14 on which is mounted an external housing 12, base 14 and external housing 12 defining the exterior of countertop filter unit 10. Adapter assembly 16 is designed to be connected to fluid flow, as from, for example, a sink, by means of connector 26. Fluid flow entering the adapter through connector 26 may be directed to countertop filter unit 10 by way of conduits 18, or through direct throughput opening 24 in adapter 16, by stopcock 22.

Figure 2:
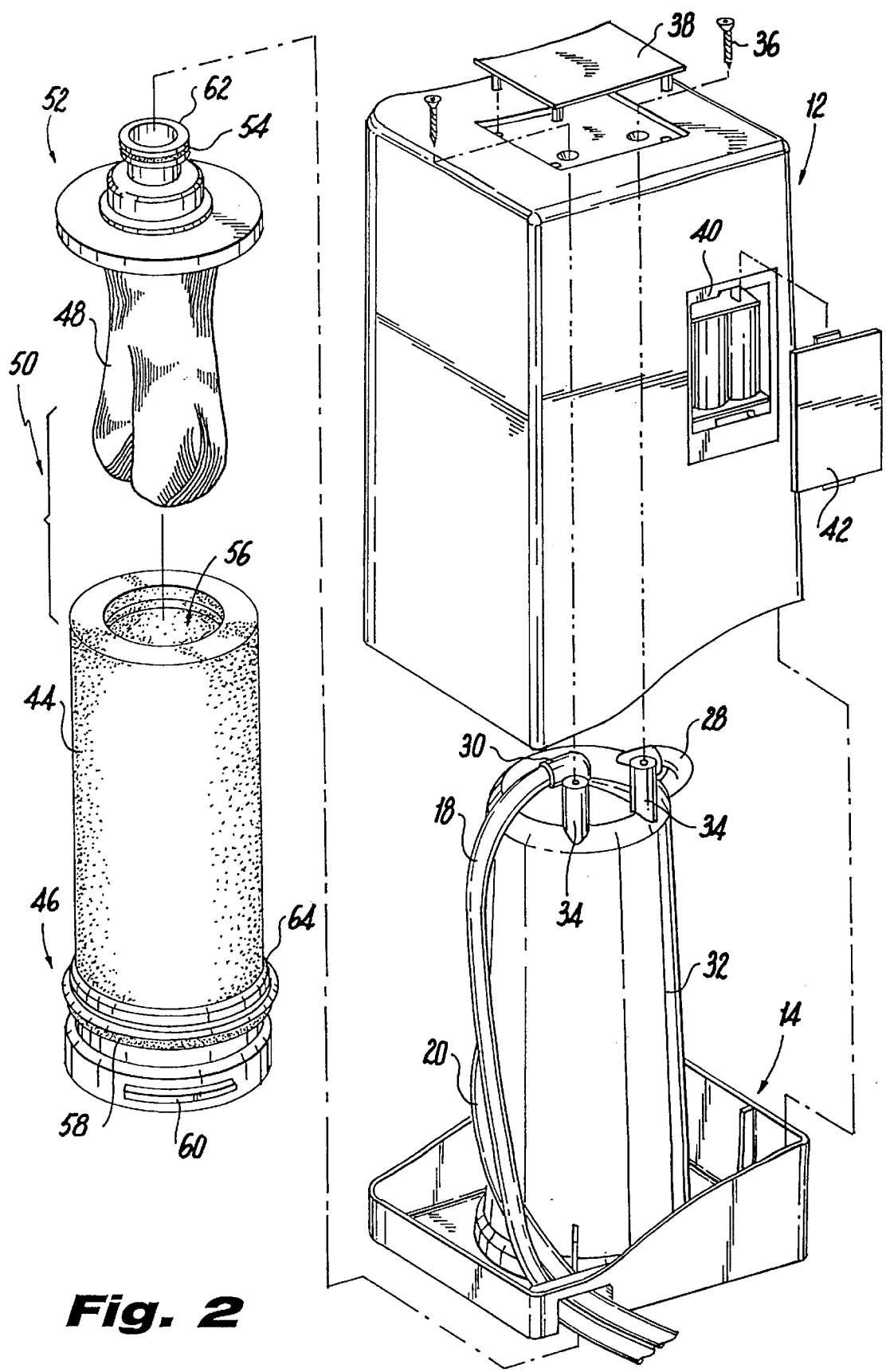
FIG. 2 is a perspective view of a filter unit and filter cartridge assembly embodiment of the present invention;.

Now referring to FIG. 2, there is shown a perspective view of a filter unit assembly embodiment of the present invention. Base 14 includes sump 32 which is dimensioned to fit a filter cartridge, generally designated in its component parts as 50. Sump 32 is shown to have inlet and outlet, 28 and 30, for admitting to, and removing from, sump 32 fluid. Inlet 28 and outlet 30 are connected to the exterior of filter unit 10 through conduits 20 and 18, respectively. Sump 32 is generally surrounded by cover 12 and may be connected to the same through connecting structure, such as, but not limited to, screws 36 and threaded receptacles 34. A first panel 38 may be positioned over screws 36 to provide for a more aesthetic cover 12 exterior. Cover 12 may further house therein a power source 40 for powering any electronics associated with the filter, such as a timing clock (not shown) to indicate whether filter change is recommended. A second panel 42 may be positioned over power source 40 to provide for a more aesthetic cover 12 exterior. Base 14 may be equipped with stand-offs 74 (See FIG. 5).

Figure 6:
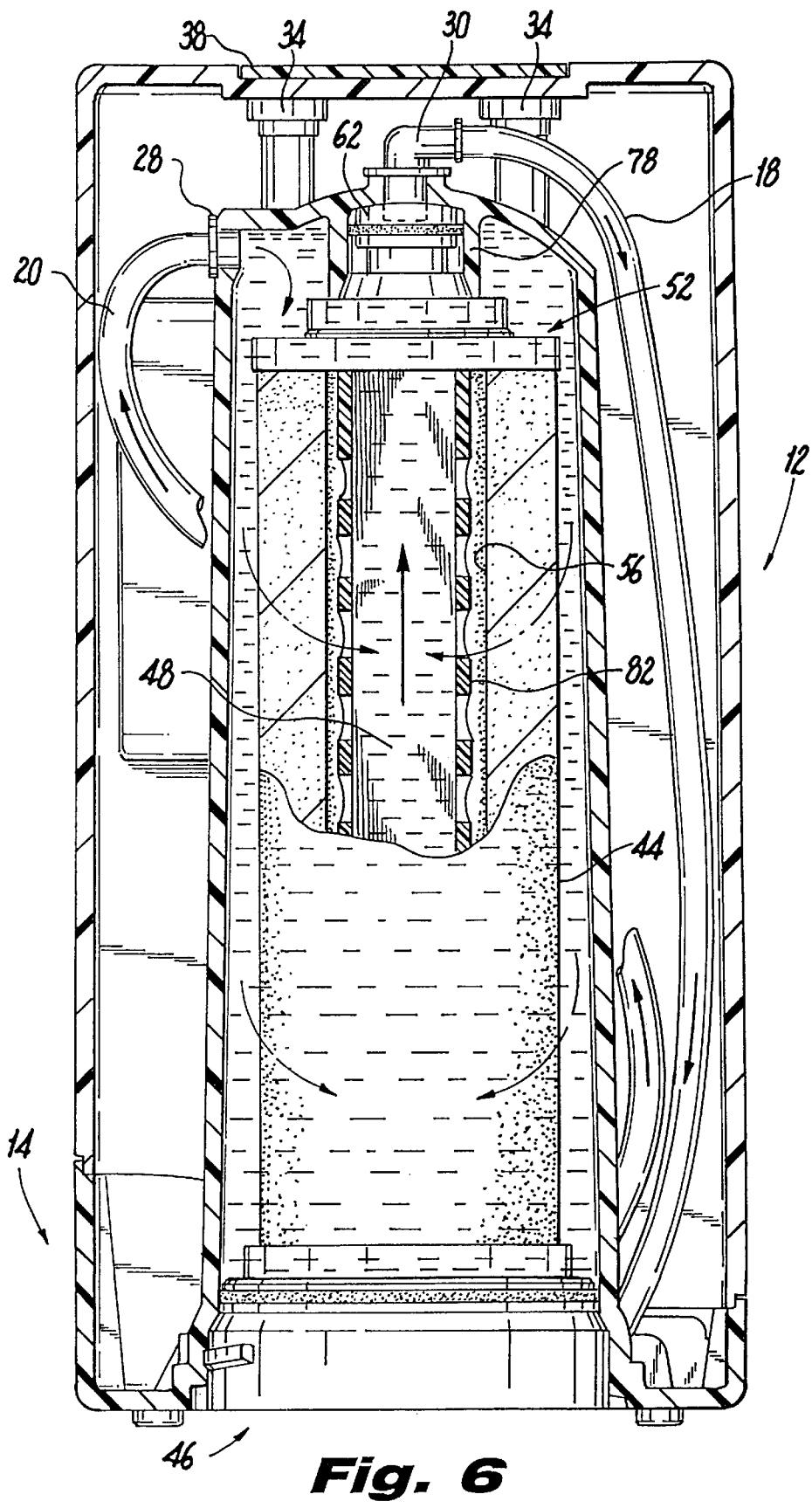
FIG. 6 is a cross-sectional view of the assembled filter unit embodiment of FIG. 2.

Filter cartridge 50, or any other filter cartridge adapted to sealingly fit within sump 32, may be utilized in countertop filter unit 10. Filter cartridge 50 is comprised of two filter elements, one comprising a jacket of carbonaceous material, 44, the other comprising a U-shaped bundle of hollow, microporous fibers 48 as a preferred embodiment. The jacket of carbonaceous material 44 may be formed by an extrusion process. Hollow, microporous, fiber bundle 44 is housed concentrically within the cavity 56 formed by carbonaceous jacket 44. Hollow, microporous, fiber bundle 48 is formed by potting hollow, microporous fibers in the bottom portion of upper cage 82 (See FIG. 8). Upper end-cap 52 has a sealing neck 62 for sealingly connecting to internal sump collar 78 as shown in FIG. 6. Sealing neck 62 preferably is fitted with upper seal 54 to aid in complete sealing between sealing neck 62 and internal sump collar 78. Filter cartridge 50 is further fitted with a lower end-cap 46.

Figure 8:
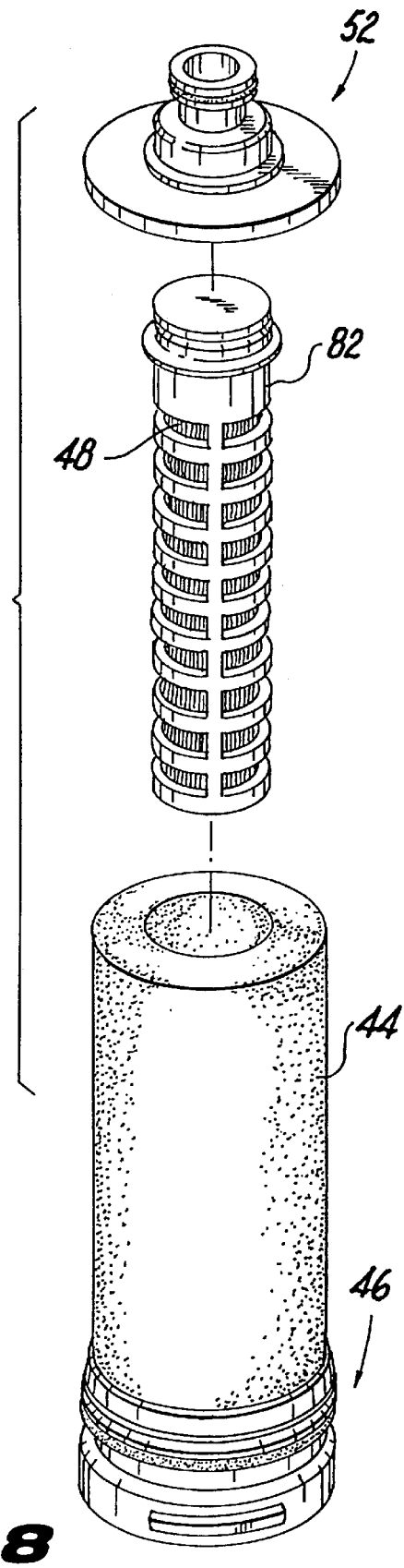
FIG. 8 is a perspective view of a filter cartridge assembly embodiment of the present invention.

As shown in perspective view in FIG. 8, the U-shaped bundle of hollow, microporous fibers 48 may be contained in a cage 82, cage 82 and hollow, microporous fibers being pulled in upper end-cap 52. Cage 82 is positioned within cavity 56 formed by carbonaceous jacket 44.

Figure 3:
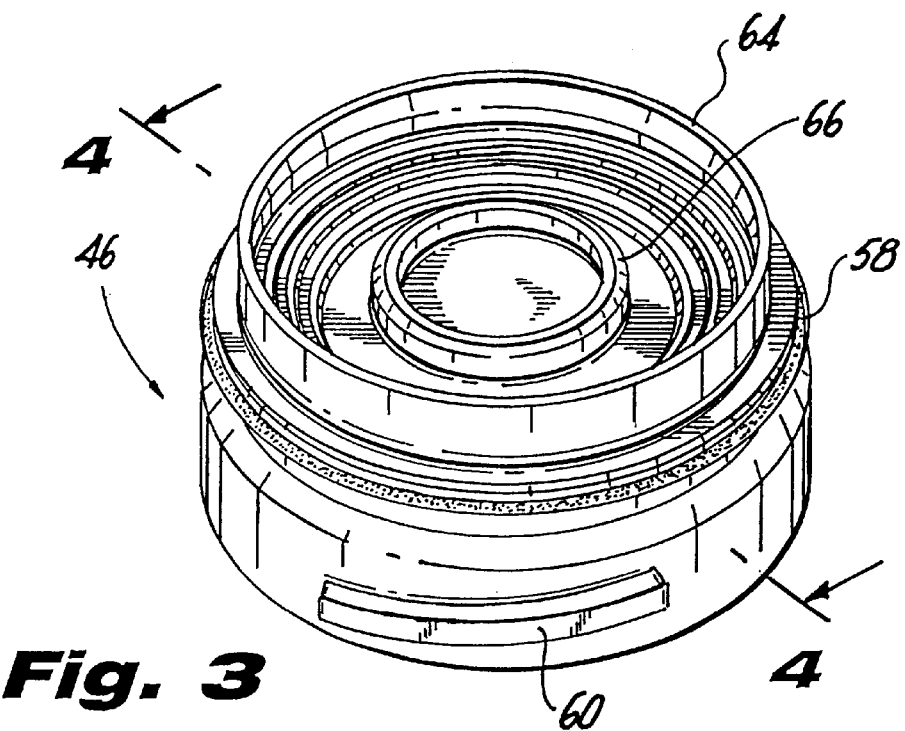
FIG. 3 is a perspective view of an end-cap for engagement into the base portion of the filter unit assembly of FIG. 2.
Figure 4:
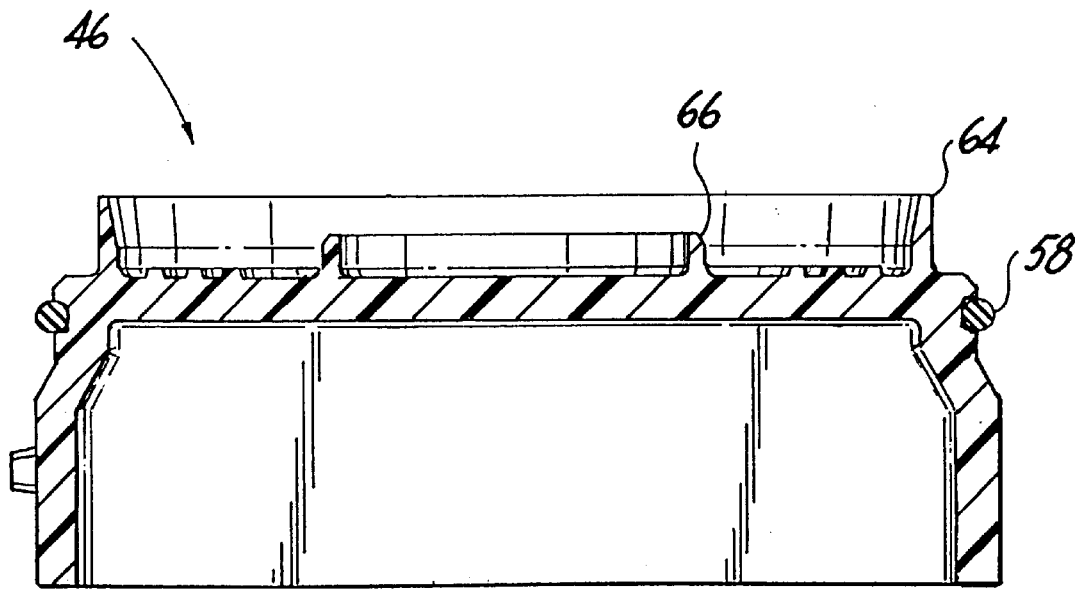
FIG. 4 is a cross-sectional view of the end-cap of FIG. 3 cut along axis 4—4.

As shown in perspective view in FIG. 3, and in cross-sectional view in FIG. 4 (along 4—4 line of FIG. 3), lower end-cap 46 has recessed portion 64 for receiving one end of carbonaceous jacket 44. Lower end-cap 46 further has positioned therein centering collar 66 dimensioned so as to fit into cavity 56 of carbonaceous jacket 44. Centering collar 66 aids in centering carbonaceous jacket 44 in lower end-cap 46. Lower end-cap 46 further houses lower seal 58 for aiding in complete sealing between lower end cap 46 and upper surface 76 (See FIG. 5) of base 14. Lower end cap 46 is further constructed with engagement ledge 60 for engaging threaded shoulders 72 (See FIG. 5) of base 14.

Figure 5:
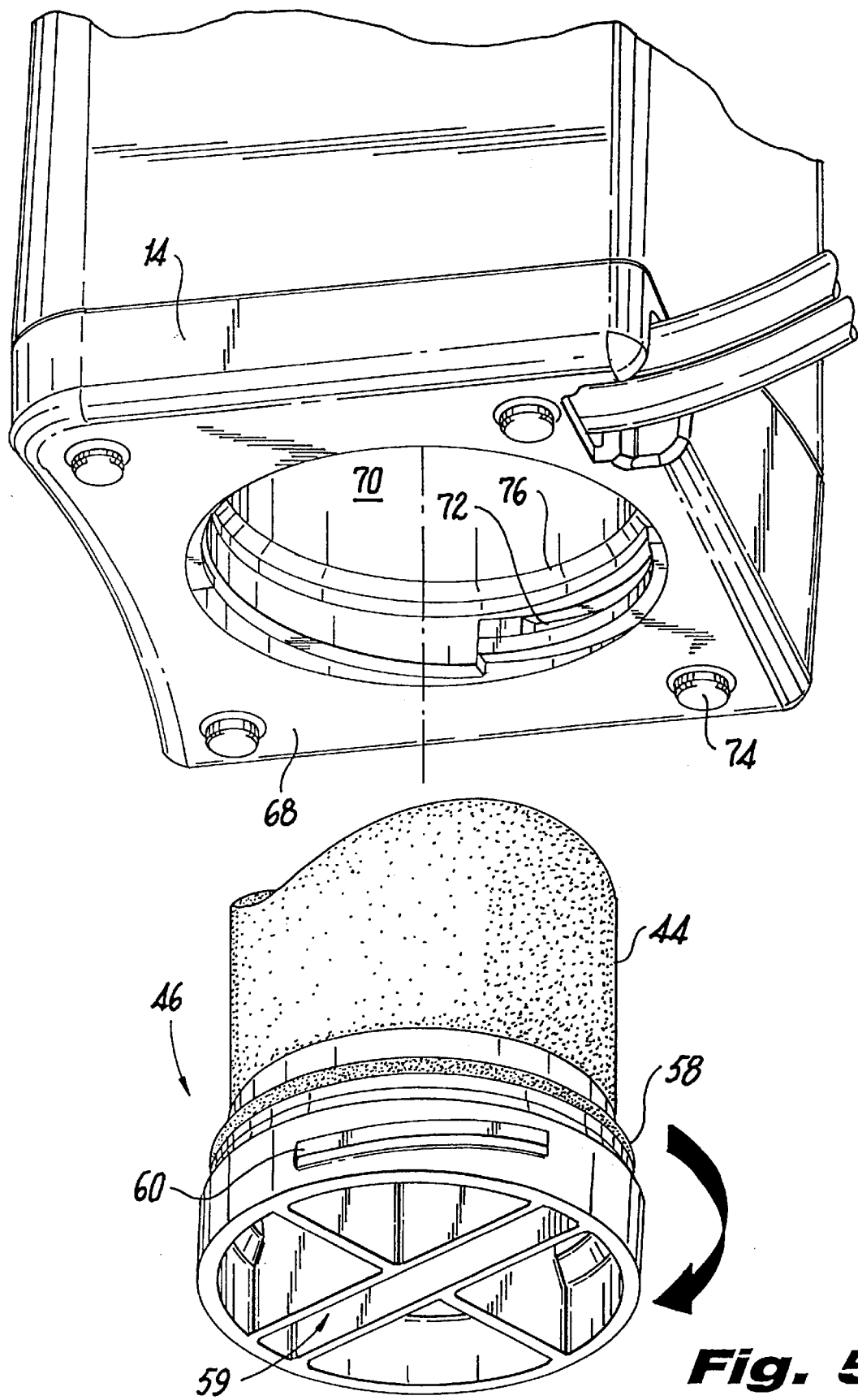
FIG. 5 is an interior perspective view, partly in section, of a filter element end-cap/base coupling mechanism of an embodiment of the present invention.
Figure 7:
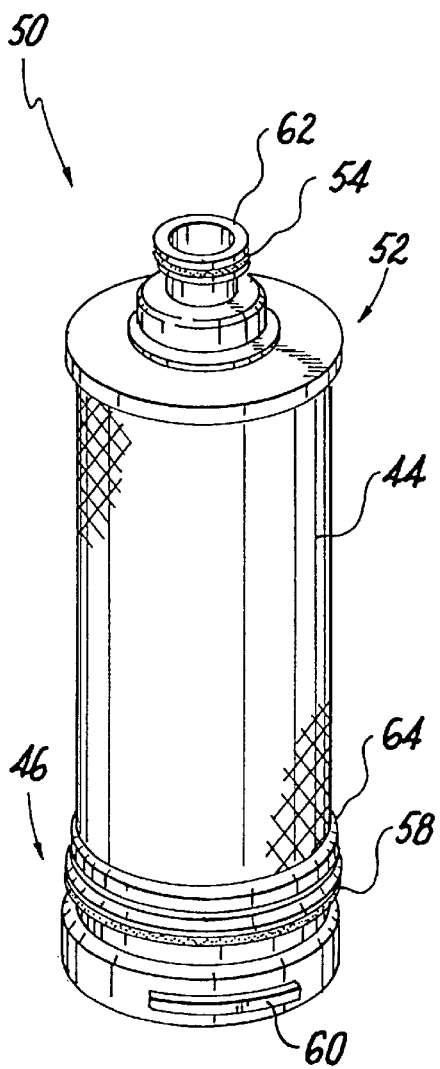
FIG. 7 is a perspective view of the assembled filter cartridge of FIG. 2.

The manner of engaging assembled filter cartridge 50, illustrated in FIG. 7, into base 14 of countertop filter unit 10 is shown in FIG. 5. Upper end-cap 52 of assembled filter cartridge 50 is inserted through base opening 70 from inferior base surface 68. Lower end-cap 46 is subsequently coupled to base 14 by engaging engagement ledge 60 along engaging threaded shoulders 72 so as to affect axial translation of the filter cartridge 50 relative to base 14. Preferably, once lower end-cap 46 is rotated into its locked position, lower end-cap 46 will be flush with base 14. Coupling may be through means of interlocking camming surfaces. Preferably, engagement is such that lower seal 58 is sealing engaged with respect to superior base surface 76. Preferably simultaneous with coupling of lower end-cap 46 with base 14, upper end-cap 52 is also being sealing coupled to the internal surface of internal sump collar 78. Lower end-cap 46 may also be fabricated to have slot 59 in its inferior surface to permit insertion of instruments into slot 59 to ease turning of filter cartridge 50 and thus to engage coupling.

Now referring to FIG. 6, there is shown a cross-sectional view of the assembled filter unit embodiment of FIG. 2. As illustrated, fluid enters through conduit 20 through inlet 28. Fluid circulates about carbonaceous filter element 44 and under pressure crosses the walls of carbonaceous element 44 entering into carbonaceous element cavity 56. Fluid in carbonaceous element cavity 56 is forced by pressure to exit through hollow, microporous fiber bundle 48 and then through upper end cap neck 62 to outlet 30, upper end cap neck 62 being sealingly connected to sump outlet sealing part 78 of sump 32. Outlet 30 is attached to conduit 18 from which filtered water may be obtained. Microporous fiber bundle 48 may be unhoused in cavity 56, or as illustrated, enclosed within a housing, for example, cage 82, which preferably is perforated, and more preferably disposed so as to permit exposure of more than 40% of the total surface area of the fiber bundle to the surrounding fluid.

While the invention has been described with respect to preferred embodiments, those skilled in the art will readily appreciate that various changes and/or modifications can be made to the invention without departing from the spirit or scope of the invention as defined by the appended claims.

What is claimed is:

1. A method for fabricating a compound filter cartridge for filtering fluids comprising the steps of:

a) providing a carbon block filter element having an outer surface and an inner surface, said carbon block filter element inner surface defining a void approximately concentric with a central axis of said carbon block filter element, said carbon block filter element having sufficient permeability to permit passage of fluid from said outer surface through said inner surface of said carbon block filter element into said void and having a k-value of between 0.01 to about 0.10;

b) providing a selectively permeable fiber bundle comprising a plurality of hollow, microporous fibers each having a first open end and a second open end an a multiplicity of pores along the surface thereof, wherein said first and second open-ends are potted in a sealing compound body such that said first open end and said second open end of each of said hollow, microporous fibers are exposed on an outer end face of said sealing compound body permitting fluid flowing radially toward said central axis and entering said hollow, microporous fibers to exit through said outer end face of said sealing compound body;

c) positioning said selectively permeable fiber bundle in said void of said carbon block filter element such that more than about 40% of the surface area of the selectively permeable fiber bundle is unsheathed from radial flows; and d) scalingly connecting said sealing compound body to said outer surface of said carbon block filter element.

2. A method of according to claim 1, wherein the step of providing a selectively permeable fiber bundle comprising a plurality of hollow, microporous fibers, further includes providing hollow, microporous fibers with pores having a maximum dimension of about 0.20 microns.

3. A method according to claim 2, wherein the step of providing a selectively permeable fiber bundle comprising a plurality of hollow, microporous fibers, further includes providing hollow, microporous fibers having pores forming tortuous, interconnected channels leading from one surface of the fiber to the other.

4. A method according to claim 1, wherein the step of providing a selectively permeable fiber bundle comprising a plurality of hollow, microporous fibers, further includes providing hollow, microporous fibers having pores which permit the flow of fluids but block passage of sub-micron particles and solutes.

5. A method according to claim 1, wherein the step of providing a selectively permeable fiber bundle comprising a plurality of hollow, microporous fibers each having a first open end and a second open end and a multiplicity of pores along the surface thereof, wherein said first and second open-ends are potted in a sealing compound body such that said first open end and said second open-ends of each of said hollow, microporous fibers are exposed on an outer end face of said scaling compound body permitting fluid flowing radially toward said central axis and entering said hollow, microporous fibers to exit through said outer end face of said sealing compound body, further includes providing a sealing compound body selected from the group consisting of: polyurethane, epoxy, polyethylene and polypropylene.

6. A method according to claim 1, wherein the step of providing a carbon block filter element having an outer surface and an inner surface, said carbon block filter element inner surface defining a void approximately concentric with a central axis of said carbon block filter element, said carbon block filter element having sufficient permeability to permit passage of fluid from said outer surface through said inner surface of said carbon block filter element into said void and having k-value if between about 0.01 to 0.10, further includes providing a carbon block filter element defined at least in part by an extruded carbon block.

7. A method according to claim 1, further comprising the step of positioning said selectively permeable fiber bundle in said void of said carbon block filter element such that more than about 50% of the surface area of the selectively permeable fiber bundle is unsheathed from radial flow.

8. A method according to claim 1, further comprising the step of positioning said selectively permeable fiber bundle in said void of said carbon block filter element such that more than about 75% of the surface area of the selectively permeable fiber bundle is unsheathed from radial flow.

9. A method according to claim 1, wherein the step of providing a carbon block filter element having an outer surface and an inner surface, said carbon block filter element inner surface defining a void approximately concentric with a central axis of said carbon block filter element, said carbon block filter element having sufficient permeability to permit passage of fluid from said outer surface through said inner surface of said carbon block filter element into said void and having a k-value of between about 0.01 to about 0.10, further includes providing a carbon block filter element having a k-value of between about 0.02 to 0.07.

10. A method according to claim 1, wherein the step of providing a carbon block filter element having an outer surface and an inner surface, said carbon block filter element inner surface defining a void approximately concentric with a central axis of said carbon block filter element, said carbon block filter element having sufficient permeability to permit passage of fluid from said outer surface through said inner surface of said carbon block filter element into said void and having a k-value of between about 0.01 to about 0.10, further includes providing a carbon block filter element having a k-value of between about 0.03 to about 0.05.

11. A method for fabricating a compound filter cartridge for filtering fluids comprising the steps of:
   a) providing a carbon block filter element having an outer surface and an inner surface, said carbon block filter element inner surface defining a void approximately concentric with a central axis of said carbon block filter element, said carbon block filter element having sufficient permeability to permit passage of fluid from said outer surface through said inner surface of said carbon block filter element into said void and having a k-value of between about 0.01 to about 0.10;
   b) providing a cage structure configured to fit within said carbon block filter element void;
   c) positioning said cage structure in said carbon block filter element void;
   d) providing a selectively permeable fiber bundle configured to fit within said cage structure, said selectively permeable fiber bundle comprising a plurality of hollow, microporous fibers each having a first open end and a second open end and a multiplicity of pores along the surface thereof, at lest said first open-end being potted in a sealing compound body; and
   e) positioning said selectively permeable fiber bundle in said cage structure and said scaling compound body anterior to said cage structure and said carbon block element, such that said first open end of said hollow, microporous fibers is exposed on an outer end face of said sealing compound body permitting fluid flowing radially toward said central axis and entering said hollow, microporous fibers to exit through said outer end face of said sealing compound body, wherein said cage structure has sufficient openwork such that more than about 40% of the surface area of said selectively permeable fiber bundle is in radial-flow contact with fluid when fluid fills said carbon block filter element void.

12. A method according to claim 11, wherein the step of providing a selectively permeable filter bundle comprising a plurality of hollow, microporous fibers, further includes providing hollow, microporous fibers with pores having a maximum dimension of about 0.2 microns. interconnected channels leading from one surface of the fiber to the other.

13. A method according to claim 12, wherein step of providing a selectively permeable fiber bundle comprising a plurality of hollow, microporous fibers, further includes providing hollow, microporous fibers having pores forming tortuous, interconnected channels leading from one surface of the fiber to the other.

14. A method according to claim 11, wherein the step of providing a selectively permeable fiber bundle comprising a plurality of hollow, microporous fibers, further includes providing hollow, microporous fibers having pores which permit the flow of gases and vapors but block passage of sub-micron particles and solutes.

15. A method according to claim 11, wherein the step of providing a selectively permeable fiber bundle comprising a plurality of hollow, microporous fibers each having a first open end and a second open end and a multiplicity of pores along the surface thereof, wherein said first and second open-ends are potted in a sealing compound body such that said first open end and said second open end of each of said hollow, microporous fibers are exposed on an outer end face of said sealing compound body permitting fluid flowing radially toward said central axis and entering said hollow, microporous fibers to exit through said outer end face of said sealing compound body, further includes providing a sealing compound body selected from the group consisting of: polyurethane, epoxy, polyethylene and polypropylene.

16. A method according to claim 11, wherein the step of providing a carbon block filter element having an outer surface and an inner surface, said carbon block filter element inner surface defining a void approximately concentric with a central axis of said carbon block filter element, said carbon block filter element having sufficient permeability to permit passage of fluid from said outer surface through said inner surface of said carbon block filter element into said void and having a k-value of between about 0.01 to about 0.10, further includes providing a carbon block filter element defined at least in part by an extruded or molded carbon block.

17. A method according to claim 11, further comprising the step of positioning said selectively permeable fiber bundle in said cage structure and sealing compound body anterior to said cage structure and said carbon block element, such that more than about 50% of the surface area of the selectively permeable fiber bundle is in radial-flow contact with fluid flowing radially toward said central axis when said carbon filter element void is filled with fluid.

18. A method according to claim 11, further comprising the step of positioning said selectively permeable fiber bundle in said cage structure and sealing compound body anterior to said cage structure and said carbon block element, such that more than about 75% of the surface area of the selectively permeable fiber bundle is in radial-flow contact with fluid flowing radially toward said central axis when said carbon filter element void is filled with fluid.

19. A method according to claim 11, wherein the step of providing a carbon block filter element having an outer surface and an inner surface, said carbon block filter element inner surface defining a void approximately concentric with a central axis of said carbon block filter element, said carbon block filter element having sufficient permeability to permit passage of fluid from said outer surface through said inner surface of said carbon block filter element into said void and having a k-value of between about 0.01 to about 0.10, further includes providing a carbon block filter element having k-value of between about 0.02 to about 0.07.

20. A method according to claim 11, wherein the step of providing a carbon block filter element having an outer surface and an inner surface, said carbon block filter element inner surface defining a void approximately concentric with a central axis of said carbon block filter element, said carbon block filter element having sufficient permeability to permit passage of fluid from said outer surface through said inner surface of said carbon block filter element into said void and having k-value of between about 0.01 to about 0.10, further includes providing a carbon block filter element having a k-value of between about 0.03 to about 0.05.

21. A method according to claim 11, further comprising the steps of positioning a pre-filter on said carbon block filter element to cover the outer surface of said carbon block filter element.

22. A method for fabricating a compound filter cartridge for filtering fluids comprising the steps of:

a) providing a pre-filter element for filtering course particulates configured so as to surround a void;
b) providing a carbon block filter element having a k-value of between about 0.01 to 0.10, said carbon block filter element configured to fit within said pre-filter element void and defining a void approximately concentric with a central axis of said carbon block filter element;
c) positioning said carbon block filter element in said pre-filter element void;
d) providing a selectively permeable fiber bundle configured to fit within said carbon block filter element, said selectively permeable fiber bundle comprising a plurality of hollow, microporous fibers each having a first open end and a second open end and a multiplicity of pores along the surface thereof, wherein said first and second open ends are potted in a sealing compound body in such a manner that said first open end and said second open end of each of said hollow, microporous fibers are exposed on an outer end face of said sealing compound body permitting fluid entering said hollow, microporous fibers to exit through said outer end face of said sealing compound body; and
c) positioning said selectively permeable fiber bundle in said carbon block filter element void such that more than about 40% of the surface area of the selectively permeable fiber bundle is unsheathed from radial flow.

23. A method according to claim 22, wherein the step of providing a selectively permeable fiber bundle comprising a plurality of hollow, microporous fibers, further includes providing hollow, microporous fibers with pores having a maximum dimension of about 0.20 microns.

24. A method according to claim 23, wherein the step of providing a selectively permeable fiber bundle comprising a plurality of hollow, microporous fibers, further includes providing hollow, microporous fibers having pores forming tortuous, interconnected channels leading from one surface of the fiber to the other.

25. A method according to claim 22, further comprising the step of positioning said selectively permeable fiber bundle in said void of said carbon block filter element such that more than about 50% of the surface area of the selectively permeable fiber bundle is unsheathed from radial flow.

26. A method according to claim 22, further comprising the step of positioning said selectively permeable fiber bundle in said void of said carbon block filter element such that more than about 75% of the surface area of the selectively permeable fiber bundle is unsheathed from radial flow.

27. A method according to claim 22, further comprising the step of positioning the compound filter cartridge within a fluid filter unit having a filter cartridge receiving cavity, at lest one fluid inlet and at least one fluid outlet, wherein the compound filter cartridge is positioned in the filter cartridge receiving cavity such that fluid from the at least one fluid inlet is exposed to the pre-filter element and fluid exiting through the outer end face of the sealing compound body is received by the at least one fluid outlet.

28. A method according to claim 27, further comprising the step of associating the at least one fluid inlet with an adaptor for providing fluid communication to the least one fluid inlet.

29. A method according to claim 28, further comprising the step of securing the adaptor to a fluid source.

30. A method for fabricating a filter cartridge for filtering fluids comprising the steps of:

a) providing a carbon block filter element having opposed top and bottom ends and an outer surface and an inner surface, said carbon block filter element inner surface defining an axial cavity approximately concentric with a central axis of said carbon block filter element, said carbon block filter element having sufficient permeability to permit passage of fluid from said outer surface through said inner surface of said carbon block filter element into said axial cavity and having a k-value of between about 0.01 to 0.10;

b) providing a first end cap having a neck portion defining an axial passage and having a sealing member positioned on an outer periphery thereof;

c) providing a second end cap defining a body portion having a recess formed therein for receiving the bottom end of the carbon block filter element and including a threadable engagement surface positioned on the outer periphery thereof;

d) securing said first end cap to said top end of said carbon block filter element; and e) securing said second end cap to said bottom end of said carbon block filter element.

31. A method according to claim 30, wherein the step of providing a carbon block filter element having an outer surface and an inner surface, said carbon block filter element inner surface defining an axial cavity approximately concentric with a central axis of said carbon block filter element, said carbon block filter element having sufficient permeability to permit passage of fluid from said outer surface through said inner surface of said carbon block filter element into said axial cavity, further includes providing a carbon block filter element having a k-value of between about 0.03 to about 0.05.

32. A method according to claim 30, wherein the step of providing a carbon block filter element having an outer surface and an inner surface, said carbon block filter element inner surface defining an axial cavity approximately concentric with a central axis of said carbon block filter element, said carbon block filter element having sufficient permeability to permit passage of fluid from said outer surface through said inner surface of said carbon block filter element into said axial cavity and having a k-value of between about 0.01 to about 0.10, further includes providing a carbon block filter element having a k-value of between about 0.02 to about 0.07.

33. A method according to claim 30, further comprising the step of positioning the filter cartridge within a fluid filter unit, the fluid filter unit having an elongated cavity for receiving the filter cartridge and at least one fluid inlet, wherein the filter cartridge is positioned in the elongated cavity such that fluid flow from the at least one fluid inlet is exposed to the outer surface of the carbon block filter element.

34. A method according to claim 33, further comprising the step of securing the threadable engagement surface to a corresponding threadable engagement surface defined on a portion of the elongated cavity.

35. A method according to claim 33, further comprising the step of securing at least one outlet conduit for fluid from the axial passage on the first end cap.

36. A method according to claim 33, further comprising the step of connecting the at least one fluid inlet with a fluid source.

37. A method according to claim 33, further comprising the step of connecting the at least one fluid inlet with an adaptor providing fluid communication between a fluid source and the at least one fluid inlet.

* * * * *